US010718100B2

(12) United States Patent
Brandt et al.

(10) Patent No.: US 10,718,100 B2
(45) Date of Patent: Jul. 21, 2020

(54) ELECTRO-HYDRAULIC FEED DELIVERY SYSTEM

(71) Applicant: Van-Tech Corporation, Savage, MN (US)

(72) Inventors: William Duane Brandt, Mound, MN (US); Samual Francis Newbauer, Minneapolis, MN (US); Dave Heiling, Shakopee, MN (US)

(73) Assignee: Van-Tech Corporation, Savage, MN (US)

( * ) Notice: Subject to any disclaimer, the term of this patent is extended or adjusted under 35 U.S.C. 154(b) by 257 days.

(21) Appl. No.: 15/818,241

(22) Filed: Nov. 20, 2017

(65) Prior Publication Data

US 2018/0142445 A1 May 24, 2018

Related U.S. Application Data

(60) Provisional application No. 62/424,899, filed on Nov. 21, 2016.

(51) Int. Cl.
*E02F 9/22* (2006.01)
*A01D 61/00* (2006.01)
(Continued)

(52) U.S. Cl.
CPC .......... *E02F 9/2235* (2013.01); *A01D 61/008* (2013.01); *A01D 90/105* (2013.01);
(Continued)

(58) Field of Classification Search
CPC ... A01D 61/008; A01D 90/105; E02F 9/2235;
E02F 9/2242; E02F 9/2267; E02F 9/2292;
F15B 11/165; F15B 11/17; F15B 21/087;
F15B 2211/20538; F15B 2211/20546;
F15B 2211/20576; F15B 2211/30555;
F15B 2211/3111; F15B 2211/50536;
F15B 2211/50554; F15B 2211/50581;
F15B 2211/575; F15B 2211/6055;
(Continued)

(56) References Cited

U.S. PATENT DOCUMENTS

RE24,920 E * 1/1961 Palmer ...................... B60P 1/40
414/526
4,717,308 A * 1/1988 Kuhns ...................... B60P 1/42
414/307
(Continued)

*Primary Examiner* — Patrick Hamo
*Assistant Examiner* — Joseph S. Herrmann
(74) *Attorney, Agent, or Firm* — Dorsey & Whitney LLP (57) ABSTRACT

A hydraulic system for a feed delivery unit according to the present disclosure may include a pump configured to supply a total flow, the pump including at least one suction port configured to be connected to a reservoir and at least one outlet port configured to be connected to a supply line, a control valve fluidly coupled to the pump and including a plurality of valve sections, the control valve being coupled to the pump such that the total flow supplied by the pump is distributed among the plurality of valve sections, and wherein each valve section of the plurality of valve sections is configured to control a direction of flow of a portion of the total flow, and a plurality of hydraulic motors fluidly coupled to the pump via the control valve, each of the motors being configured to drive a respective auger of the feed delivery unit.

20 Claims, 7 Drawing Sheets (51) Int. Cl.
*F16H 61/47* (2010.01)
*F15B 21/08* (2006.01)
*F16H 61/02* (2006.01)
*A01D 90/10* (2006.01)
*F16H 61/4148* (2010.01)
*F16H 61/421* (2010.01)
*F16H 61/4078* (2010.01)
*F15B 11/17* (2006.01)
*F15B 11/16* (2006.01)

(52) U.S. Cl.
CPC .......... *E02F 9/2242* (2013.01); *E02F 9/2267* (2013.01); *E02F 9/2292* (2013.01); *F15B 11/165* (2013.01); *F15B 11/17* (2013.01); *F15B 21/087* (2013.01); *F16H 61/0206* (2013.01); *F16H 61/4078* (2013.01); *F16H 61/4148* (2013.01); *F16H 61/421* (2013.01); *F16H 61/47* (2013.01); *F15B 2211/20538* (2013.01); *F15B 2211/20546* (2013.01); *F15B 2211/20576* (2013.01); *F15B 2211/30555* (2013.01); *F15B 2211/3111* (2013.01); *F15B 2211/50536* (2013.01); *F15B 2211/50554* (2013.01); *F15B 2211/50581* (2013.01); *F15B 2211/575* (2013.01); *F15B 2211/6055* (2013.01); *F15B 2211/6313* (2013.01); *F15B 2211/6355* (2013.01); *F15B 2211/7053* (2013.01); *F15B 2211/7058* (2013.01); *F15B 2211/7135* (2013.01); *F16H 2061/0209* (2013.01)

(58) Field of Classification Search
CPC ...... F15B 2211/6313; F15B 2211/6355; F15B 2211/7053; F15B 2211/7058; F15B 2211/7135; F16H 61/0206; F16H 61/4078; F16H 61/4148; F16H 61/421; F16H 61/47; F16H 2061/0209
See application file for complete search history.

(56) References Cited

U.S. PATENT DOCUMENTS

| | | | | |
|---|---|---|---|---|
| 4,856,278 | A * | 8/1989 | Widmann | E02F 9/2239 60/423 |
| 5,297,381 | A * | 3/1994 | Eich | E02F 9/22 60/452 |
| 5,394,696 | A * | 3/1995 | Eich | E02F 9/22 60/420 |
| 9,254,773 | B2 * | 2/2016 | Farley | B60P 1/42 |

\* cited by examiner

ELECTRO-HYDRAULIC FEED DELIVERY SYSTEM

CROSS-REFERENCE TO RELATED APPLICATION

This application claims the benefit under 35 U.S.C. § 119 to U.S. Provisional Application No. 62/424,899, filed Nov. 21, 2016 and entitled "ELECTRO-HYDRAULIC FEED DELIVERY SYSTEM," which is hereby incorporated by reference in its entirety for all purposes.

BACKGROUND

Trailer- or body-mounted agricultural feed delivery systems, also referred to as feed delivery units, are used to transport agricultural feed. The feed delivery unit includes three main delivery augers, namely a floor auger, a vertical auger, and a discharge auger, which are operated simultaneously to transfer feed from the bulk bins of the unit to a receiving bin at the site. In a typical unloading operation, the floor auger transfers feed from the bulk bins towards the rear of the unit, the feed then transitions to the second or vertical auger. The vertical auger transfers the feed from the bottom transition vertically to the discharge auger. The discharge auger then transfers the feed from the top of the vertical auger (near the top of the unit) to the location of the receiving feed bin.

Hydraulic components of a typical trailer- or body-mounted agricultural feed delivery system, interchangeably referred to as a feed delivery unit, typically include a power take-off (PTO), tandem fixed or variable displacement hydraulic pump, a hydraulic control valve, and three hydraulic motors. The system utilizes the tractor engine power and transfers this power via the PTO and hydraulic tandem pump to power the three hydraulic motors, which hydraulically drive the three main augers in the feed delivery unit. Additional augers and hydraulic motors may be used in specialty applications.

In conventional hydraulic systems of feed delivery units, one pump of the tandem PTO driven hydraulic pump drives and is dedicated to the floor auger and the second pump drives and is dedicated to the vertical auger and the discharge auger in a split circuit (i.e., flow from each pump always remains in a separate circuit with no opportunity to combine flow between pumps). The second pump may be plumbed such that it drives the individual motors which power the vertical and discharge augers in series, that is, the outlet from one motor feeds the inlet of the other motor. Alternatively, the second gear pump may be plumbed so that it drives the two motors powering the vertical and discharge auger in parallel, that is, the flow from the second pump is divided, e.g., using a flow divider and/or a directional flow control valve, between the two motors. In either case, conventional systems typically have two distinct pumps plumbed in two distinct circuits, with one pump dedicated to the floor auger and the other pump dedicated to the vertical and discharge augers. In this type of system, excess flow from one pump cannot be shared with other functions and is sent to tank as wasted energy, resulting in low productivity, elevated oil temperatures and premature component failure.

Figure 1:
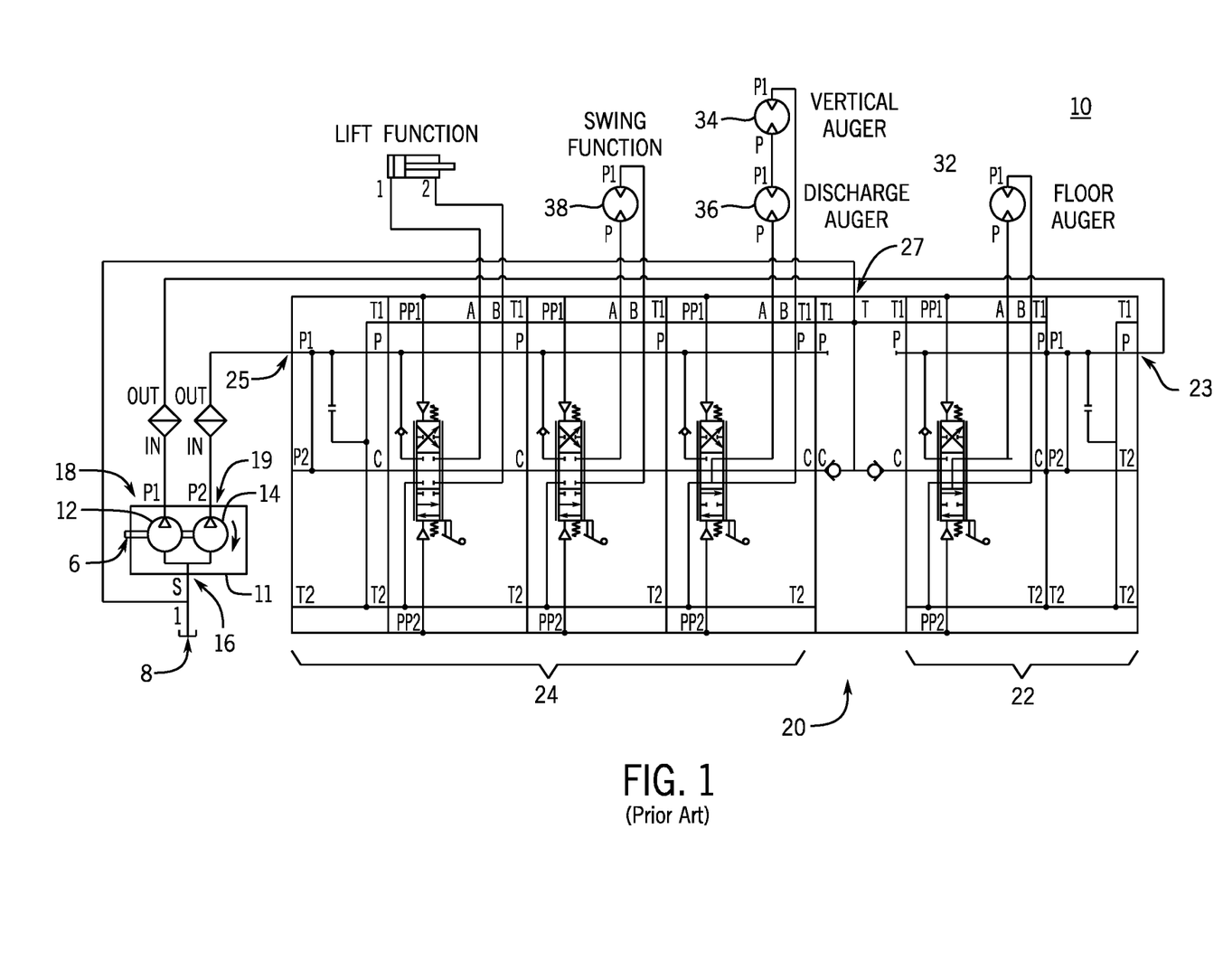
FIG. 1 is a circuit diagram of a conventional hydraulic system of a feed delivery unit.

Additionally, feed delivery units are also typically equipped with the functionality to position the discharge auger over the receiving bin, which functionality is typically split into a lift/lower function and a swing function. Typically, these functions do not operate at the same time as the auger functions and therefore could be powered by either of the first or second pumps. FIG. 1 shows a hydraulic diagram of a conventional hydraulic system 10 of a feed delivery unit, in which the pumps are labeled as 12 and 14, the control valve is labeled as 20, and the motors are labeled as 32, 34, 36, and 38. In the system in FIG. 1, the lift/lower function and the swing function are powered by the same pump as the vertical and discharge augers.

The inventors have recognized a number of shortcomings in existing hydraulic systems for feed delivery units. For example, there is variability in the flow rates provided by conventional systems, which can impact performance and productivity. Available hydraulic flow rate from the pump can vary depending on PTO ratio, set engine rpm, pump displacement and pump efficiency. The input flow typically ranges from 40-60 GPM (or 20-30 GPM per pump), but in some cases can be less than or greater than the range stated. To initiate the operation of the hydraulic system, the operator engages the PTO and sets the engine speed corresponding to the desired hydraulic flow rate. The PTO drives the hydraulic pump providing flow to the hydraulics on the feed delivery unit. The flowrate is therefore dependent on the engine speed, PTO ratio, pump displacement and pump efficiency which could all vary from truck to truck and on the truck itself over time. As a result, feed units operate with differing flow rates, impacting performance, productivity, and component durability.

To functionally handle the pump flow from this two-pump system and to split the circuit, a conventional hydraulic control valve typically has two inlets 23, 25 and one outlet 27. The first inlet 23 feeds the floor circuit 22 with one pump of the tandem pump (i.e., pump 12) and the second inlet 25 feeds the vertical/discharge circuit 24 with the other pump (i.e., pump 14). The lift and swing functions are on one of the two circuits, in the illustrated example on the vertical/discharge circuit 24, and as described previously are operated when not operating the augers. A conventional hydraulic control valve such as the one illustrated in FIG. 1 generally keeps each pump separated, combining the flow in the outlet 27 to return to tank. The valve is typically of an open center design sending any unused flow back to tank 8, as shown in FIG. 1.

During operation of such conventional system, the floor auger can provide more feed to the vertical/discharge circuit than the vertical/discharge augers can transfer from the unit. When this happens the flow of feed can become blocked and raise the hydraulic pressure in the auger circuits until the system stalls. Common industry accepted hydraulic solutions implemented to prevent feed blockage include adding additional valves to the circuit and either manual operator input or automatic pressure sequencing to reduce the floor auger speed. If operator input is required, the operator manually adjusts a separate flow control valve controlling hydraulic flow rate to the floor auger motor. This allows the operator to restrict the flow to the floor auger which dumps excess flow to tank. The operator must adjust the valve during operation by observing the pressures in the vertical/discharge circuit. If the pressure on the vertical/discharge circuit rises above an acceptable value, the operator reduces the flow rate to the floor to slow it down. In addition, the operator typically needs to adjust the flow control as the oil heats up during operation. Thus, conventional systems are heavily dependent on a skilled operator paying close attention to system pressures and temperatures.

If automatic functionality is required to slow the floor auger to prevent feed blockage, then a separate hydraulically-piloted sequence valve is added to the circuit. The sequence valve opens once the vertical/discharge pressure reaches a pre-determined value. The sequence valve then dumps a set amount of flow from the floor motor to tank. In either case, if the operator manually slows down the floor auger or the sequence valve automatically slows it down, the excess flow diverted from the floor auger to tank is wasted energy, reducing productivity and increasing the hydraulic oil temperature.

Existing hydraulic systems also rely on the operator to set the truck engine RPM (e.g., cruise control) at the correct speed which is typically around 1000-1200 RPM. Feed delivery units today have few safeguards to prevent the operators from running the hydraulic system at excessive engine speeds. If the operator sets the engine RPM above the specified setting, such as 1500 RPM, for example, a hydraulic system designed for 60 GPM now has 80 GPM flow rate. This excess flow rate creates heat and over-speed conditions causing premature failures of the hydraulic components and degradation of oil lubricity properties which causes further wear of the components and ultimately reduces the system durability.

Thus, improvements and safeguards to existing hydraulic systems for feed delivery units may be desirable.

SUMMARY

This summary is provided to introduce a selection of concepts disclosed herein and described further below. This summary is not intended to identify key or essential features not is it intended to limit the scope of the claimed subject matter.

A hydraulic system for a feed delivery unit according to some examples of the present disclosure may include a pump configured to supply a total flow, wherein the pump includes at least one suction port configured to be connected to a reservoir and at least one outlet port configured to be connected to a supply line, a control valve fluidly coupled to the pump and comprising a plurality of valve sections, wherein control valve is coupled to the pump such that the total flow supplied by the pump is distributed among the plurality of valve sections, and wherein each valve section of the plurality of valve sections is configured to control a direction of flow of a portion of the total flow, and a plurality of hydraulic motors fluidly coupled to the pump via the control valve, each of the motors configured to drive a respective auger of the feed delivery unit.

A hydraulic valve according to some examples of the present disclosure may include a first end section configured to generate pilot pressure, wherein the first end section comprises a pressure relief valve element configured to limit pressure in the hydraulic valve to a predetermined operating pressure and a pressure reducing valve element configured to reduce pressure on a pilot line of the hydraulic valve, a plurality of valve sections, each configured to control a direction of flow to and from a primary actuator, wherein each of the plurality of valve sections includes a six-way proportional directional control valve element with a pilot-operated spring-centered spool, and wherein each of the plurality of valve sections further comprises a pressure compensating element, and a second end section configured to provide bypass compensation and hydraulic over-speed control, wherein the second end section comprises a compensating element configured to bypass hydraulic fluid not used by the hydraulic valve to tank and a ON-OFF valve configured to limit a rate of flow into the valve to a predetermined flow rate. In some embodiments of the valve, one or more of the valve section sections may be configured to proportionally control a portion of a total flow provided to the primary actuators independent from operating load.

BRIEF DESCRIPTION OF THE DRAWINGS

For better understanding, like elements have been designated by like reference numbers throughout the various accompanying figures. Understanding that these drawings depict only typical embodiments of the disclosure and are not therefore to be considered to be limiting of its scope, the embodiments of the disclosure will be described and explained with additional specificity and detail through the use of the accompanying drawings in which.

DETAILED DESCRIPTION

Embodiments disclosed herein relate to a hydraulic system for a feed delivery unit. Features from any of the disclosed embodiments may be used in combination with one another, without limitation. In addition, other features and advantages of the present disclosure will become apparent to those of ordinary skill in the art through consideration of the following detailed description and the accompanying drawings.

Figure 2:
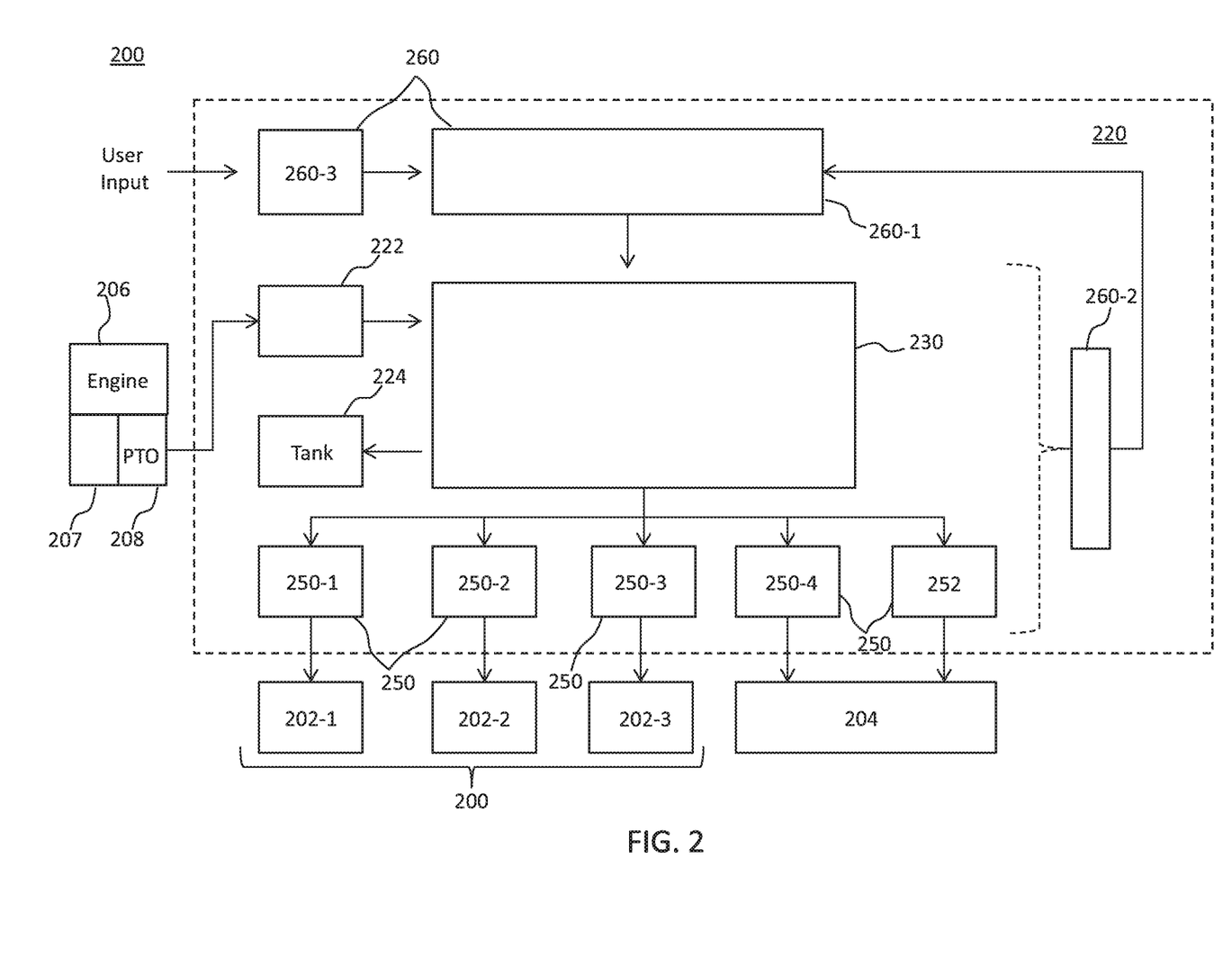
FIG. 2 is a block diagram of a feed delivery unit in accordance with the present disclosure.

FIG. 2 is a block diagram of a feed delivery unit 200 in accordance with some examples herein. The feed delivery unit 200 may be a truck-mounted or trailer type unit and may include one or more bulk bins configured to store agricultural feed or other dry bulk goods for transport. The bulk bins of the feed delivery unit 200 are operatively associated with moving components such as one or more augers 202 and at least one boom 204 for unloading the feed into a receiving bin. Typically, the feed delivery unit 200 includes at least three augers, namely a floor auger 202-1, a vertical auger 202-2, and a discharge auger 202-3, which are collectively referred to as primary augers and which operate to move the feed from the bulk bins to the boom 204 and into a receiving bin at the destination location.

The feed delivery unit 200 may include a hydraulic system 220 configured to operate the moving components (e.g., the augers and boom) of the feed delivery unit 200. The hydraulic system 220 may include a power source 222 (e.g., a hydraulic pump) which draws hydraulic fluid from a reservoir or tank 224, a plurality of primary actuators 250 (e.g., hydraulic motors and/or cylinders configured to transform the source energy, in this case hydraulic energy, to mechanical energy for driving the moving components of the feed unit), and a control valve 230 fluidly coupled to the pump and configured to distribute the flow from the pump to the primary actuators 250. In the embodiment in FIG. 1, the hydraulic system 220 includes four hydraulic motors 250-1, 250-2, 250-3, and 250-4 and one hydraulic cylinder 252. However, in other examples a different number or combination of motors and/or cylinders may be used. The hydraulic system 220 may also include electronic components 260, such as an electronic controller 260-1 configured to electronically actuate the control valve 230, sensors 260-2 configured to measure relevant parameters, such as pressure in the valve and/or hydraulic lines or rotational speed of the auger motors or augers, and provide the measurements to the controller 260-1, and a user input device 260-3, such as a radio remote control transmitter, which may be wirelessly communicatively coupled with the electronic controller 260-1 (e.g., via a radio receiver in the input device 260-3) to transmit user inputs to the controller 260-1 for operating the valve or other functions of the unit such as lights or top door. Additionally and optionally, the electronic components may include a display for providing visual feedback (e.g., of the system's performance and/or health) to an operator. Additionally and optionally, wireless communication functions of the electronics of the system may enable telematics and remote monitoring of the system. Additionally and optionally, the control valve 230 may include one or more manual overrides (see e.g., manual handles 460-1e, 460-2e, and 480-e in FIG. 4).

Figure 3:
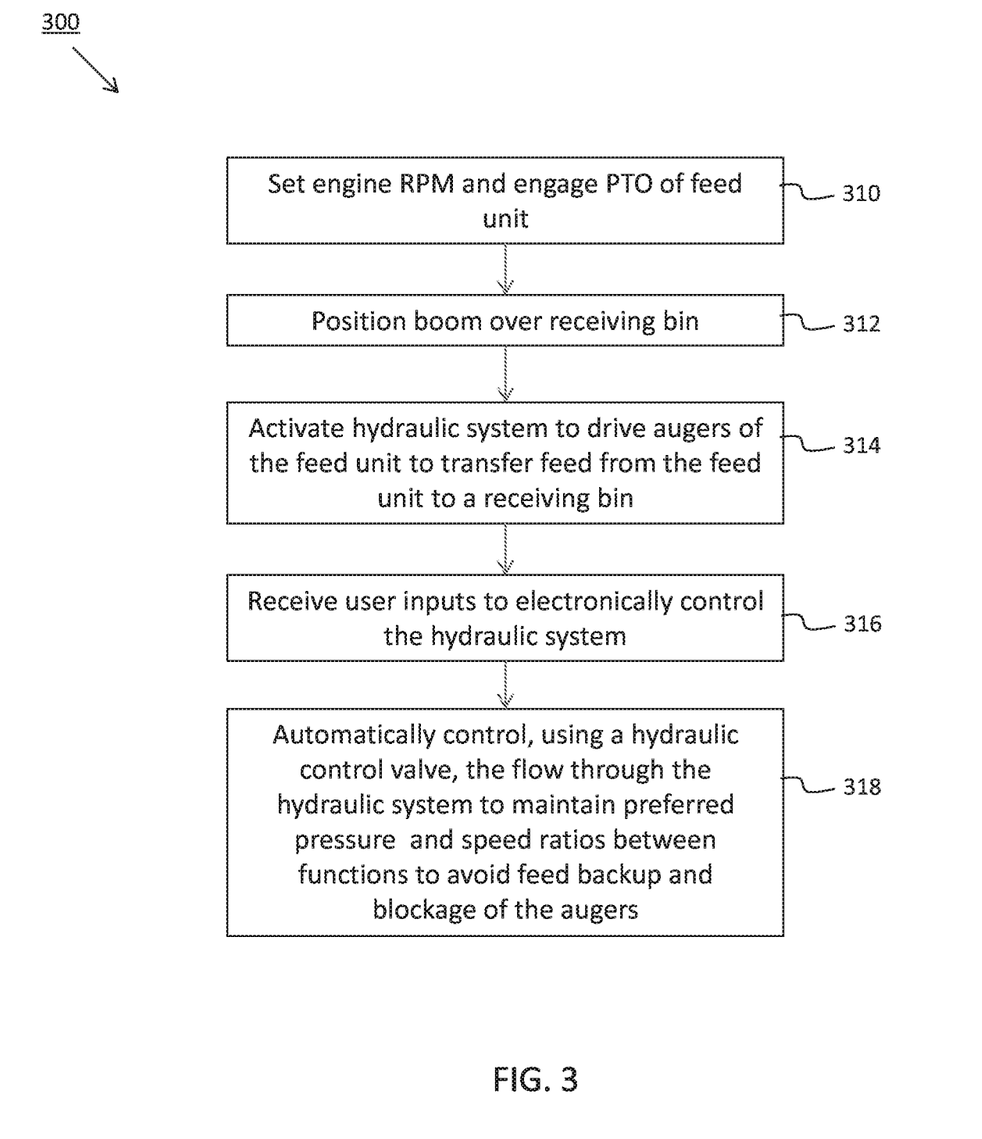
FIG. 3 is a flow diagram of a process of operating a feed delivery unit in accordance with the present disclosure.

During typical operation, and with reference now also to the process 300 in FIG. 3, once the feed delivery unit has arrived at the destination location and is aligned with a receiving bin, the operator engages the power take off (PTO) 208 (see FIG. 2) to provide vehicle engine power 206 to the power source 222 of the hydraulic system 220, as shown in block 310 of the process 300. The PTO 208 includes a drive shaft which may be coupled to the engine's shaft via the vehicle's transmission 207. The PTO drive shaft rotates a shaft of the hydraulic power source 222 to generate hydraulic power, which is supplied to the hydraulic system 220. As further shown in block 310, the operator sets the engine RPM. The RPM may be adjusted initially until the engine is set to an ideal operating engine speed, such as an engine speed that correlates to the appropriate pump displacement or flow rate (e.g., GPM).

Continuing with process 300, the operator may adjust the position of the boom 204, which may include raising, lowering, and/or rotating the boom to place the outlet end of the boom over the opening of the receiving bin, as shown in block 312. Continuing with block 314, the hydraulic system is activated to begin powering the augers of the feed unit such that feed from the bulk bin can be transferred to the receiving bin. In some examples, the augers may be activated simultaneously. In other examples, the operator may activate the vertical and discharge augers first, then activate the floor auger. The system may ramp power to the augers for soft start, which may improve component life. Once the augers have been activated, the operator opens the rear-most gate of the feed delivery unit. As the feed empties from the rear-most end of the unit, the operator sequentially opens additional gates moving towards the front of the vehicle until either the receiving bin becomes full or the feed delivery unit is emptied. An indicator that the receiving bin is full may be the buildup of pressure in the discharge auger. As shown in block 318, the system may be configured to automatically shut off if the pressure increases to an unacceptable level. Furthermore, at any time during the operation of the hydraulic system, user inputs may be received, such as via the radio controller 260-3, to electronically control operation of the system, as shown in block 316. The particular sequence of opening the bins described above is one example of a sequence. It will be understood that different sequences may be used, for example opening multiple bins at one time.

Hydraulic systems according to the examples herein may utilize electro-hydraulic circuitry, sensors & programming to address three main issues in the feed delivery industry: productivity, efficiency, and durability. In an example embodiment, the hydraulic system is arranged to utilize all available flow from two hydraulic pumps in tandem. The total flow from both pumps is combined and made available across all functions of the hydraulic system. The total flow is automatically distributed within the control valve to the auger motors while maintaining an optimum pressure balance and speed ratio between the functions determined to avoid feed backups and blockages. The system may be configured to automatically distribute the flow without operator interaction and with varying flow rates from the two pumps. In the event that the system pressure in the vertical or discharge circuit increases signifying a potential blockage, the speed ratio is changed electro-hydraulically to increase the speed of the vertical and discharge augers while slowing down the floor auger until the pressure balance is back to acceptable levels at which time the original auger speed ratios are set back to optimum productivity levels.

One unique aspect of the present system may be the ability to automatically maintain an acceptable operational pressure balance between the auger functions. This may be achieved, in part, due to the three primary motors being hydraulically in parallel and sized individually for optimum speed and torque, which allows all three motors to operate at or near the same hydraulic pressure throughout the feed unloading process. Maintaining a balanced pressure system may be important for reducing system inefficiencies which contribute to elevated oil temperatures, another concern in the feed delivery industry.

The present system may also be configured to reduce risk of damage or premature wear due to variability in operator-set engine speeds. The hydraulic system may be equipped with an over-speed control function, which is configured to prevent operation of the system at engine RPMs that exceed an acceptable level. In one example, as will be described further below, if the hydraulic control valve detects an input flow above a predetermined maximum, the valve will bypass all input flow to tank and prevent the operator from running the system at a destructive flow rate. The operator will then have to lower the engine RPM to an acceptable setting before the system can be operated.

As previously described, FIG. 1 is a hydraulic circuit diagram of a typical hydraulic system 10 for a feed delivery unit. The system includes a pair of fixed displacement pumps 12, 14 in a tandem arrangement 11, which supply flow to the hydraulic control valve 20. The shaft 6 of the tandem pump 11 is connected to a PTO of the feed delivery unit. The inlet 16 of the pump is connected to tank 8 and the outlets 18, 19 of each of the pumps 12, 14, are connected to the floor 22 and vertical/discharge 24 circuits, respectively. The pumps 12, 14 provide hydraulic fluid at a fixed flow rate to the control valve 20. The flow rate depends on the displacement of the pumps, pump efficiency, and the rotational speed of the PTO (e.g., engine RPM and PTO ratio). The control valve 20 may be an open center, as shown, or a closed center valve with a bypass compensator. The hydraulic control valve may be piloted with pneumatics, electronics, electrohydraulics, or manually controlled. The floor motor 32 is typically separated from the vertical and discharge motors 34, 36, such as by a mid-outlet (as shown), a mid-inlet, or a separating plate, or in some cases by the use of two separate valves for the two separate circuits.

The output flow from the tandem hydraulic pump on a feed delivery truck may vary depending on the components in the system and the operator setting the engine speed. The control valve 20 of a conventional system is typically designed with an ideal flow rate. The operator can provide more flow to the control valve than the ideal flow rate by setting too high of an engine speed, which leads to overall inefficiencies in the system and destructive hydraulic oil temperatures. The operator can also set too low of an engine speed or the efficiency may be different between the two pumps, thus resulting in a speed imbalance in the floor, vertical, and discharge augers causing the flow of feed in one or more of the auger to become blocked. The motors driving the vertical and discharge augers may be connected in series, that is with the output from one motor driving the second motor, with either the vertical or the discharge motor being first in the series followed by the other. The series configuration limits the amount of pressure either motor can operate at thus limiting the torque output, which typically results in the use of oversized motors in order to obtain sufficient torque to move the feed in the feed delivery unit. The oversized motors typically lead to a decrease in production due to the additional flow needed to turn the motor at the same speed of a smaller motor. The series configuration may also lead to premature failures of the motors. The pressure that the first motor in the series configuration experiences is the combination of the inlet pressure and outlet pressure, which would be the inlet pressure of the second motor.

Figure 4:
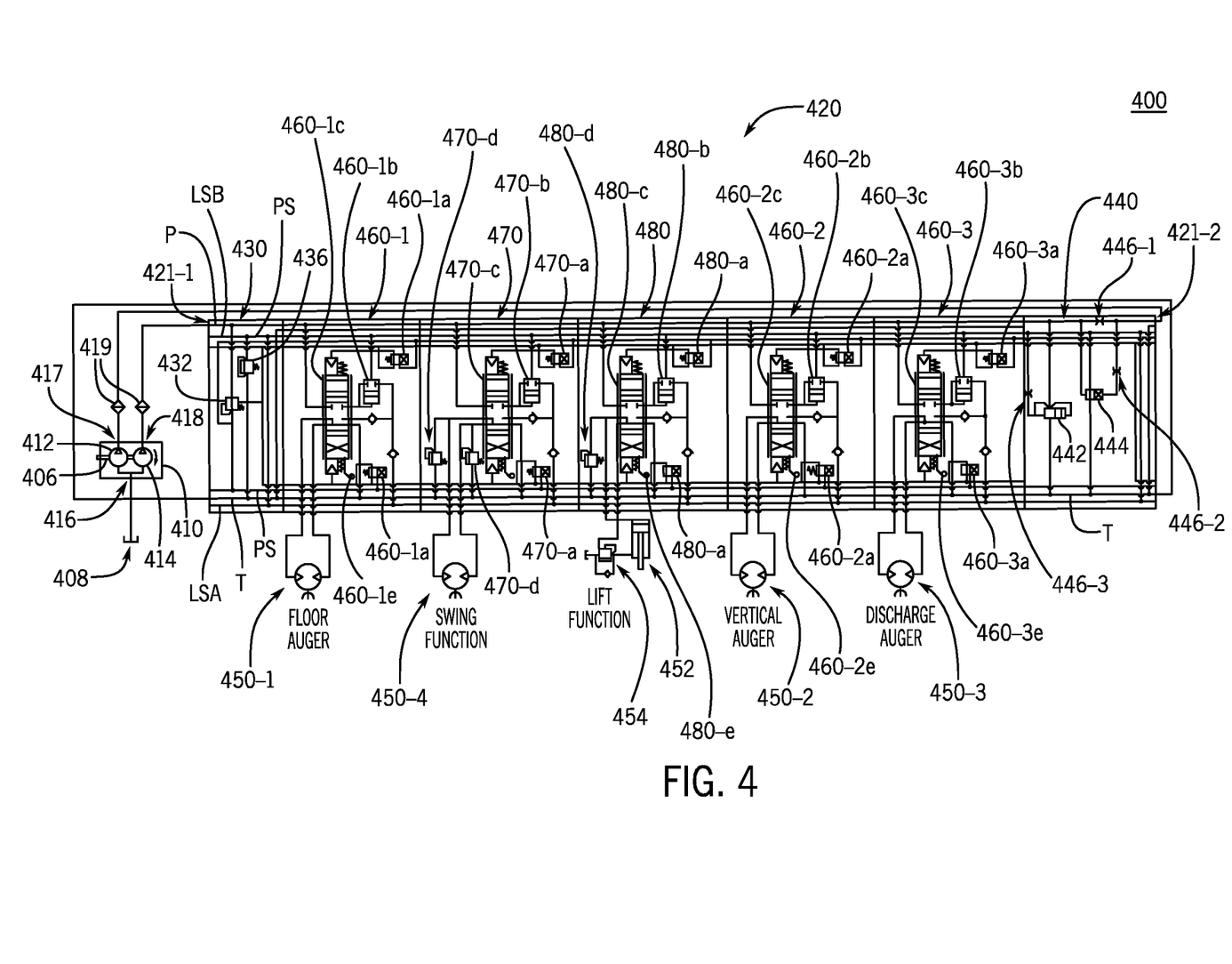
FIG. 4 is a circuit diagram of a hydraulic system of a feed delivery unit in accordance with the present disclosure.

FIG. 4 shows a circuit diagram of a hydraulic system 400 which can be installed in a feed delivery unit, such as unit 200, in accordance with the present disclosure. While described in the context of agricultural feed delivery units, the hydraulic system or components thereof (e.g., the control valve) may be used in other applications which require coordinated operation of multiple actuating components. The hydraulic system 400 may include a hydraulic power source 410 (e.g., one or more hydraulic pumps), a control valve 420 (also referred to as valve assembly), a plurality of primary actuators (e.g., motors 450 and a hydraulic cylinder 452).

Power Source

The hydraulic power source 410 may include a fixed-displacement single, double, or triple pump, or a variable displacement (e.g., single, double, or triple) pump. In the illustrated embodiment in FIG. 4, the system 400 includes a tandem or double pump for a power source 410. The tandem pump 410 includes first and second fixed-displacement pumps 412 and 414, respectively, arranged in tandem (i.e., connected to a common shaft 406 and sharing a common inlet 416). The first and second pumps 412 and 414 are driven by the shaft 406, which can be connected to a source of mechanical power (e.g., a PTO of the feed delivery unit or a motor). The hydraulic power source 410 is configured to provide hydraulic power at a flow rate, which is dependent on the displacement of the pumps 412, 416, and the rotational speed of the shaft. The inlet 416, also referred to as suction port, of the pump 410 is connected to a reservoir or tank 408. The outlets 417, 418 of the two pumps are fluidly connected such that the total flow from both pumps is combined and then distributed across the common circuit of the control valve 420. That is, each of the outlets 417 and 418 of the respective pumps 412 and 414 is connected to a common supply line P. In some examples, the flow from both pumps may be combined within the valve housing, such as within a passage represented by line P in the hydraulic circuit diagram) that fluidly connects a plurality of inlets ports (e.g., inlet ports 421-1, 421-2 of the valve 420). In other examples, the flow from the pumps may be combined externally to the valve, such as via an external manifold which may then be fluidly connected to an inlet of the valve 420. While a tandem fixed displacement pump is shown in the exemplary embodiment, the hydraulic system herein can use other number, types or arrangement of pumps, such as single fixed displacement, tandem fixed displacement, triple fixed displacement, or variable displacement pump(s). Optional filters 419 may be provided at the outlets of one or both of the pumps. In some examples, the filters 419 may be high-pressure in-line filters arranged in a fluid line connecting the outlet of a pump and an inlet of the valve 420. While not necessary for the system to operate, the filters 419 may extend the longevity of hydraulic components of the system.

Control Valve

The control valve 420 may be configured to provide flow distribution, pressure compensation, and over-speed control for precise automatic control of the operation of the augers. As shown in the embodiment in FIG. 4, the combined or total flow from the first and second pumps 412, 414 is automatically distributed across all functions by the control valve 420. The control valve 420 may be of a closed center configuration with a bypass compensator. The control valve 420 may be piloted with electronics, electrohydraulics, and/or manual handles. The control valve 420 may combine flow from either a single, double, or triple pump. The control valve 420 may utilize pressure compensation to control the output flow to each valve section (e.g., valve sections 460-1, 460-2, 460-3) based upon the size of the motor, working load, and spool design.

As described, the control valve 420 may be configured to provide hydraulic over-speed control. An over-speed control element (implemented in the circuit 440) may be configured to hydraulically sense the flow rate into the valve 420 by sensing the pressure drop across an orifice 446-1. If the flow rate provided by the power source exceeds a maximum setting, a valve element 444 may open dumping a load sense line (e.g., line LSB) to tank and thus preventing flow to the valve sections (e.g., valve sections 460-1, 460-2, 460-3, 470 and 480). This provides a safeguard to the operator over speeding the system. The operator can identify the ideal flow rate of the particular feed delivery unit by increasing the engine speed until the functions on the valve 420 no longer operate. The operator then knows that the ideal engine speed to operate the system is just below the speed at which the valve 420 ceases to operate. In this manner, the hydraulic system described herein may improve the efficiency and extend the life of the system by being adapted to prevent operation of the system at flow rates that can cause excessive heat generation and overall inefficiencies in the system.

For example, the operator may use the following procedure to identify the ideal operating speed. The operator may initially set the engine speed to an initial setting, such as 1000 RPM, and raise the boom. The operator may then begin to lower the boom. If the boom is able to lower, the engine speed may be increased by an increment, such as 50 RPM. This is repeated until the boom cannot be lowered. Once the operator has arrived at the RPM at which the boom cannot be lowered, the operator reduces the engine speed by increment, such as 50 rpm to arrive at the ideal operating engine speed for the hydraulic system. If the boom cannot be lowered after setting the engine speed at the initial RPM (e.g., 1000 RPM), the engine speed should incrementally (e.g., by an increment of 50 RPM) be reduced until the boom can be lowered, which would be the ideal operating engine speed for the hydraulic system.

The exemplary RPM settings described above may be used for a pump that operates at speeds ranging between 900-2400 rpm (such as a PGP350 pump supplied by PARKER HANNIFIN) or a pump equivalent to or larger than the PGP350 pump. If a smaller pump is used, such as a PGP330 pump from PARKER HANNIFIN or smaller, the operator may need to initially set the engine speed below the rated speed of the PTO. In any scenario, when finding the ideal operating speed, the rated speed of the PTO should not be exceeded.

Additionally, the hydraulic system may be configured, such as via a counterbalance 454 valve element that may be internal or external to the control valve 420, to provide a load holding function. The inclusion of a load holding function may reduce the risk of damage to the feed delivery unit such as when lowering the boom.

In the illustrated embodiment, the control valve 420 has a first end section schematically illustrated by the circuit 430, a second end section schematically illustrated by the circuit 440, and a plurality of valve sections also referred to as spool sections. The end section indicated by circuit 430 generates and feeds the pilot pressure for the spool sections and may therefore be interchangeably referred to as pilot-generating end section 430. The end section indicated by circuit 440 provides bypass compensation and hydraulic over-speed control (HOC) and may therefore be interchangeably referred to as bypass compensating and HOC end section 440.

Each of the spool sections are configured to control a direction of flow of a portion of the total flow supplied by the pump. The valve 420 in the illustrated example includes five spool sections 460-1, 460-2, 460-3, 470, and 480, each of which is associated with a respective primary actuator of the system. Each of the spool sections, which may have individually set maximum operating pressure, may be electronically proportionally controlled based on the amount of current supplied to solenoids associated with each section.

Pilot-Generating End Section

As noted, the pilot-generating end section 430 generates and feeds the pilot pressure, via pilot line PS, to the pilot ports of each of the spool sections and may therefore be interchangeably referred to as pilot generating end section. The end section 430 includes a normally open pressure relief valve 436 and a normally closed pilot operated pressure reducing valve 432.

The pressure relief valve 436 may be configured as a load sense clipper relief valve, which is operable to set the maximum operating pressure of the control valve 420. The inlet port of the pressure relief valve 436 is connected to load sense (LSB line) and the outlet port of the valve 432 is connected to tank (e.g., T line). The pressure relief valve 436 is configured to shift the valve to the closed position to dump flow to tank when the pressure at the valve exceeds a predetermined amount. In some embodiments, this predetermined amount (e.g., max operating pressure setting) may be pre-programmed into the control electronics, for example if a proportional pressure relief valve is utilized. In some embodiments, the max operating pressure setting may be about 2800-3000 PSI. In some embodiments, it may be 3050 PSI or greater. In some embodiments, the max setting may be lower, for example between 2000-3000 PSI. A max setting may be determined based on the specific system components and application.

The pressure reducing valve 432 may be configured to reduce pressure for the pilot circuit for operation of the spool sections of the control valve 420. The inlet port of the pressure reducing valve 432 is connected to pump (e.g., P line) and the outlet port of the valve 436 is connected to the pilot supply lines (e.g., PS lines). The normally open pressure reducing valve is configured to sense pressure at the outlet and shift toward a closed position preventing flow to and thus reducing pressure in the pilot lines when pressure at the outlet exceeds a given pressure.

Bypass Compensating End Section with Hydraulic Over-Speed Control (HOC)

As noted, the end section 440 provides hydraulic bypass compensation and over-speed control. The end section 440 includes two two-position, two-way directional control valve elements 442 and 444 and one or more flow restrictors or orifices 446-1, 446-2, and 446-3. Valve element 442 is configured to bypass hydraulic fluid (e.g., oil) not used by the control valve 420 to tank and is thus interchangeably referred to as bypass compensating element or simply bypass compensator. Valve element 444 is a ON-OFF valve configured to sense the pressure drop across the 446-1 orifice. The bypass compensator 442 and ON-OFF valve 444 work in conjunction to provide hydraulic over-speed control.

Valve element 442 has a first port connected to pump (i.e., P port) and a second port connected to tank (i.e., T port). Valve element 442 is spring actuated and has a first or closed center position and a second or straight through position. In the first position, flow through the valve and (i.e., from pump to tank) is blocked allowing flow from pump to instead go to the spool sections of the control valve 420. In the second position, flow through the valve element 442 is permitted bypassing fluid not used by the control valve to tank at low pressure. The spring chamber is connected to a load sense line (e.g., line LSB), to sense load pressure. As load pressure builds, the buildup in pressure adds to the spring force closing the valve and allowing the flow to go to the spool sections of the control valve 420.

Valve element 444 is configured to sense the pressure drop across the 446-1 orifice. The pilot side is connected upstream of the 446-1 orifice while the spring side is connected downstream of the 446-1 orifice. When flow is entering the control valve 420 at too high a flow rate, pressure builds up upstream of the 446-1 orifice, which is sensed on the pilot side of valve element 444. Valve element 444 will shift to the open position when the pressure drop across the 446-1 orifice is too large, thus draining the load sense line to tank (e.g., fluidly connecting the LSB line to the drain line T). With the load sense line LSB drained to tank, load pressure cannot build at valve element 444. Without being able to build load pressure at valve element 444, the bypass compensator 442 will open draining all flow to tank 408 (e.g. connecting the supply line P to the drain line T). The operator is now unable to operate the hydraulic systems until engine speed and thus pump flow rate is reduced to an acceptable level.

As discussed, the end section 440 may include one or more flow restrictors or orifices. The 446-1 orifice is used for the hydraulic over-speed control as described above. The orifice is sized to create a pressure upstream of the 446-1 orifice correlating to an ideal flow rate. Any flow above the ideal flow will create pressure upstream of the orifice shifting valve 444 to the open or flow through position. Additionally and optionally an orifice 446-2 may be provided on the pilot side of valve 444 to dampen out the signal on the pilot side of valve 444. While not required, this orifice may improve performance of the system. Without the 446-2 orifice, the valve 444 may oscillate between the open and closed positions at flow rates near the maximum allowable flow. Additionally and optionally an orifice 446-3 may be provided on the spring side line of valve 442 to dampen out the signal to the spring chamber of the valve 442. As with orifice 446-2, while not required, the orifice 446-3 may improve performance of the system. Without the 446-3 orifice, valve 442 may oscillate between the open and closed positions alternating between dumping fluid to tank and allowing flow to the control valve at values near the threshold or cracking pressure.

Spool Sections

Each of the spool sections may be implemented using a proportional directional control valve element configured to direct flow to and from a respective primary actuator. The first spool section may be configured to direct hydraulic fluid to and from a first hydraulic motor configured to drive a floor auger. As shown in the hydraulic circuit in FIG. 4, the work ports A and B of the first spool section 460-1 are connected to the inlet and outlet of the motor which is configured to operate the floor auger (e.g., motor 450-1). The first spool section is configured to control the direction of flow of fluid (e.g., from port A to port B and vice versa) in order to control the direction of rotation of the first bi-directional motor and thus the direction of rotation of the auger. Therefore, the first spool section 460-1 may interchangeably be referred to as the floor section or floor circuit.

The second spool section may be configured to direct hydraulic fluid to and from a second hydraulic motor configured to drive a vertical auger. As shown in the hydraulic circuit in FIG. 4, the work ports A and B of the second spool section 460-2 are connected to the motor, which is configured to operate the vertical auger (e.g., motor 450-2). The second spool section is configured to control the direction of flow of fluid (e.g., from port A to port B and vice versa) in order to control the direction of rotation of the second bi-directional motor and thus the direction of rotation of the auger. Therefore, the second spool section 460-2 may interchangeably be referred to as the vertical section or vertical circuit.

The third spool section may be configured to direct hydraulic fluid to and from a third hydraulic motor configured to drive a discharge auger. As shown in the hydraulic circuit in FIG. 4, the work ports A and B of the third spool section 460-3 are connected to the motor, which is configured to operate the discharge auger (e.g., motor 450-3). The third spool section is configured to control the direction of flow of fluid (e.g., from port A to port B and vice versa) in order to control the direction of rotation of the second bi-directional motor and thus the direction of rotation of the auger. Therefore, the third spool section 460-3 may interchangeably be referred to as the discharge section or discharge circuit.

Similarly, fourth and fifth spool sections 470 and 480 may be configured to control the direction of flow to and from the remaining primary actuators and thus the direction of operation of the respective actuator (e.g., clockwise and counterclockwise rotation of the swing motor or extension and retraction of the lift cylinder). As such, the fourth and fifth spool sections 470 and 480 may be referred to as swing and lift sections or circuits, respectively. In this embodiment, the floor, vertical, discharge, swing and lift circuits 460-1, 460-2, 460-3, 470, and 480, respectively, are all connected in parallel to allow optimal flow distribution.

In the embodiment in FIG. 4, each of the spool sections 460-1, 460-2, 460-3, 470, and 480 includes a six-way proportional directional control valve element (e.g., 460-1c, 460-2c, 460-3c, 470-c, and 480-c) with a pilot-operated spring-centered spool. The pilots of each of the valve elements 460-1c, 460-2c, and 460-3c may be electronically controlled, e.g., via a solenoid. Electro-hydraulic solenoids may be connected to the main spools to control the stroke of the spools based on the current sent to the solenoid. For example, the floor circuit may include a pair of first electro-hydraulic solenoids 460-1a may be operatively coupled to the pilot ports of the first directional control valve element 460-1c. Each of the electro-hydraulic solenoids 460-1a may be fluidly coupled to the pilot line PS and may receive signals (e.g., current) from and electronic controller (e.g., controller 260-1 of FIG. 2 or 560, described further below with reference to FIGS. 5 and 6) to energize the solenoid. When the solenoid is energized, the pilot spool shifts and pilot pressure is provided in one of the pilot chambers of the first directional control valve element 460-1c to actuate the main spool of the directional control valve element 460-1c towards either the straight through or cross-connect position. Proportional flow control is enabled by varying the amount of current applied to the solenoid from the electronic controller. Main spool shift or position is proportional to the current applied to the solenoid. Therefore, flow rate to the primary actuator is proportional to the main spool position and selection of spool design. A similar arrangement may be used for the remaining pilot-operated directional control valve element (e.g., 460-2c, and 460-3c) which may similarly include respective pairs of electro-hydraulic solenoids (e.g., 460-2a and 460-3a). The amount of flow sent to a primary actuator is thus based on how much the spool is stroked (e.g., based on electronic control) and the spool design. One or more of the proportional directional control valve elements 460-1c, 460-2c, 460-3c, 470-c, and 480-c may also include a manual override (e.g., manual lever 460-1e, 460-2e, and 460-3e).

Each spool section also includes a pressure compensating element (e.g., 460-1b, 460-2b, 460-3b, 470-b, and 480-b). The pressure compensating element maintains a constant pressure drop across the main spool resulting in load-independent flow control. The amount of flow sent to the primary actuator associated with a given spool section is thus solely based on the pilot signal, the spool design, and compensator.

Similar to the floor, vertical and discharge circuits, the swing and cylinder circuits include electro-hydraulic solenoids (e.g., 470-a and 480-a), which actuate the main spool, and which are stroked based on the current sent to the solenoid(s). Additionally, the swing circuit 470 and the lift circuit 480 may include one or more port relief valves (e.g., 470-d, 480-d). The relief valves 470-d of the swing circuit serve as a safety feature. If the boom impacts a structure (e.g., the receiving bin), the relief valves 470-d are configured to open allowing the boom to move. The relief valve 480-d serves as an efficiency feature and limits the working pressure for this function. When the counterbalance valve element 454 is piloted it limits the pressure in the work port. The relief valve 480-d is configured to relief pressure build up in the work port. Without the relief valve 480-d, the lift function may be deadheaded and go up to the system relief valve setting (e.g., the max pressure setting of the pressure relief valve 432).

As shown in FIG. 4, the hydraulic system of the present disclosure has a configuration in which the motors driving the vertical and discharge augers are connected in parallel instead of a series configuration as is typical in conventional systems within the industry. The parallel configuration may allow for larger working pressures at the vertical and discharge motors, which in turn may allow the motors to be downsized increasing the rotational speed of the motor for the same flow rate and thus increasing productivity of the system while using the same pump and PTO as in conventional systems. This system architecture may allow the vertical and discharge augers to operate at different speeds, which may be optimized to move feed to prevent clogging.

Primary Actuators

The work ports of the valve assembly may be connected to one or more primary actuators, such as one or more hydraulic motors and/or cylinders. As noted, each of the main augers is driven by a motor, in this embodiment, bi-directional hydraulic motors 450-1, 450-2, and 450-3. In the embodiment in FIG. 4, motor 450-1 drives the floor auger, motor 450-2 drives the vertical auger, and motor 450-3 drives the discharge auger. The system may include additional primary actuators, which may provide additional functions. For example, the system 400 may also include a fourth bi-directional hydraulic motor 450-4 configured to provide the swing function, e.g., for rotating the boom. The system 400 may further include one or more linear actuator for raising and lowering the boom. In the illustrated embodiment, the system 400 includes a double acting cylinder 452 configured to raise the boom responsive to extension of the cylinder and configured to lower the boom responsive to retraction of the cylinder. The system 400 may be configured to receive automatic electronic control inputs and/or user inputs to control operation of any of the auger, swing, and lift functions.

By combining the flow from the two hydraulic pumps 410 in the valve 420, selecting the optimal spool, and utilizing a pressure compensated electro-hydraulic control, the valve 420 may allow for precise control over the floor auger speed relative to vertical and discharge auger speed(s), removing the need to dump excess flow to tank. The faster the floor auger is turning, the higher productivity of the feed delivery unit. In an ideal scenario, the floor auger may be operate at max RPM only reducing the speed of the auger when the vertical and discharge auger cannot remove the product fast enough. The vertical and discharge motors are electronically sped-up if the pressure in the vertical or discharge auger sections starts to rise above a certain point. Pressure rising without bound in the vertical and discharge section may be caused by the floor auger delivering too much product to the vertical auger. Speeding up the vertical and discharge auger allows more feed to be removed from those auger sections.

The hydraulic motors are sized to keep an ideal speed ratio between the floor, vertical, and discharge auger as well as a pressure balance throughout the typical operation. The speed ratio is maintained due to the pressure compensation of the valve under varying loads and may be assisted with the electronic controller. Balancing pressures based on the torque demand of the motors and optimum motor sizing results in less heat generated. Having each motor in parallel instead of a series operation allows the correct sizing of motors based on each functions demand.

Electronic Control

As described the hydraulic system (e.g., system 400) may be operatively associated with electronic components which may provide electronic control (e.g., signals for operating the solenoids of the valve 420). The use of electronic control for operation of the hydraulic valve 420 may allow intelligence to be built into the system and may enable remote monitoring of the health of the system. The electronics may allow the ramp-up or soft start of the functions to reduce wear on components when switching between the ON and OFF states of the system. Sensors (e.g., pressure transducers) may be built into the system, such as to sense the hydraulic pressure at each motor. As described, an electronic controller may be programmed to stroke or de-stroke functions during a situation where the floor auger is over-feeding the vertical/discharge circuit. Electronic control can also be implemented with speed sensors on the hydraulic motors or augers. The speed can be monitored with the electronic controller. The vertical and discharge speed would then be a pre-determined multiple of the floor speed. The controller would maintain the pre-determined speed ratios resulting in the system not becoming clogged. This method of control results in increased performance from previous systems. Instead of dumping the hydraulic oil to tank from the floor section when the system is becoming imbalanced, it controls the flow to the floor auger reducing the speed. The controller can then increase the flow to the vertical and discharge valve sections resulting in faster speed at the vertical and discharge motors. Now the flow that was previously being dumped to the hydraulic reservoir is being utilized by the system to do work.

In some examples, the hydraulic pressure in the floor, vertical, and discharge circuits are being monitored. The pressure in the floor circuit is generally a function of what gate is being unloaded. When gates toward the back of the trailer are being unloaded, the pressure in the floor circuit is typically at its lowest values. As the gates open going towards the front of the feed delivery unit, the pressure in the floor circuit rises. The rise in pressure is due to more of the auger being filled with feed and having that feed travel further in the auger. The pressure in the vertical and discharge circuits will generally be the highest when the gates from the back of the trailer are being unloaded and then will decrease as the gates are opening throughout the operation. The pressure decrease in the vertical and discharge circuits decreases in this manner generally due to the larger pressure in the floor circuit. A higher pressure generally results in lower efficiency in the hydraulic motor, so the delivery rate to the vertical and discharge augers may be reduced when the gates in the front of the feed delivery unit are unloading.

In some examples, the floor auger can provide a delivery rate of feed that is too fast for the vertical and discharge augers. Feed entering the vertical and discharge augers faster than they can expel the feed may result in a backup in the vertical or discharge auger. Backups could occur if the pressure compensation is not operating correctly, a motor or pump starts to degrade in performance, operator error, or another type of variable not accounted for in the design. The system may be configured to monitor the pressure in the vertical and discharge circuits. The vertical and discharge circuits will generally be at the highest pressure when the operator begins to unload the feed delivery unit. During the operation the pressure will reduce slightly, thus a rise in the pressure after it has settled may indicate a backup or clog in the system. If that pressure rises above a threshold value, the controller sends less current to the solenoids controlling flow to the floor auger motor and increases the current to the solenoids controlling flow to the vertical and/or discharge auger motors, which slows down the floor auger and speeds up the vertical and/or discharge augers. Slowing down the floor auger reduces the feed delivery rate to the vertical and discharge augers while speeding up the vertical and discharge augers to clear up the clog. Clearing of the clog may cause the pressure in the vertical and discharge augers to reduce again, and the currents controlling the floor, vertical, and discharge circuits may then be returned to their original values.

The current is reduced proportionally to pressure in the vertical and discharge augers. The larger the pressure the less current the floor is receiving. Sometimes during operation the pressure will not reduce below the threshold value while reducing the floor current. This causes a reduced current to be continually sent to the floor auger while an increased current is continually sent to the vertical and discharge auger. The controller then balances the pressure by decreasing the current to the floor as the pressure is rising, then increasing the current to the floor as the pressure is reduced.

As an example, the pressure set point for the controller to reduce current to the floor is 2200 PSI. When the vertical or discharge auger is experiencing a pressure greater than 2000 PSI the floor current starts to be reduced. The floor current is set to 1250 mA. Above 2000 PSI the current is scaled down proportionally to the pressure. At 2600 PSI the floor current will be at 1050 mA. While under 2200 PSI the vertical and discharge currents are at 1150 mA, at 2600 PSI the current is then increased to 1220 mA. If pressure continues to rise the current continues to rise proportionally.

The controller can be configured to operate in the same manner while using speed sensors on the three auger motors instead of pressure transducers. In the speed sensor controller the motors and spools in the control valve are selected to provide a certain rotational speed to the auger. The speed ratios to maintain balance are then determined. If one motor starts to slow down due to effects previously discussed then the controller will adjust the currents to the other two auger sections to maintain the correct speed ratio.

Figure 5:
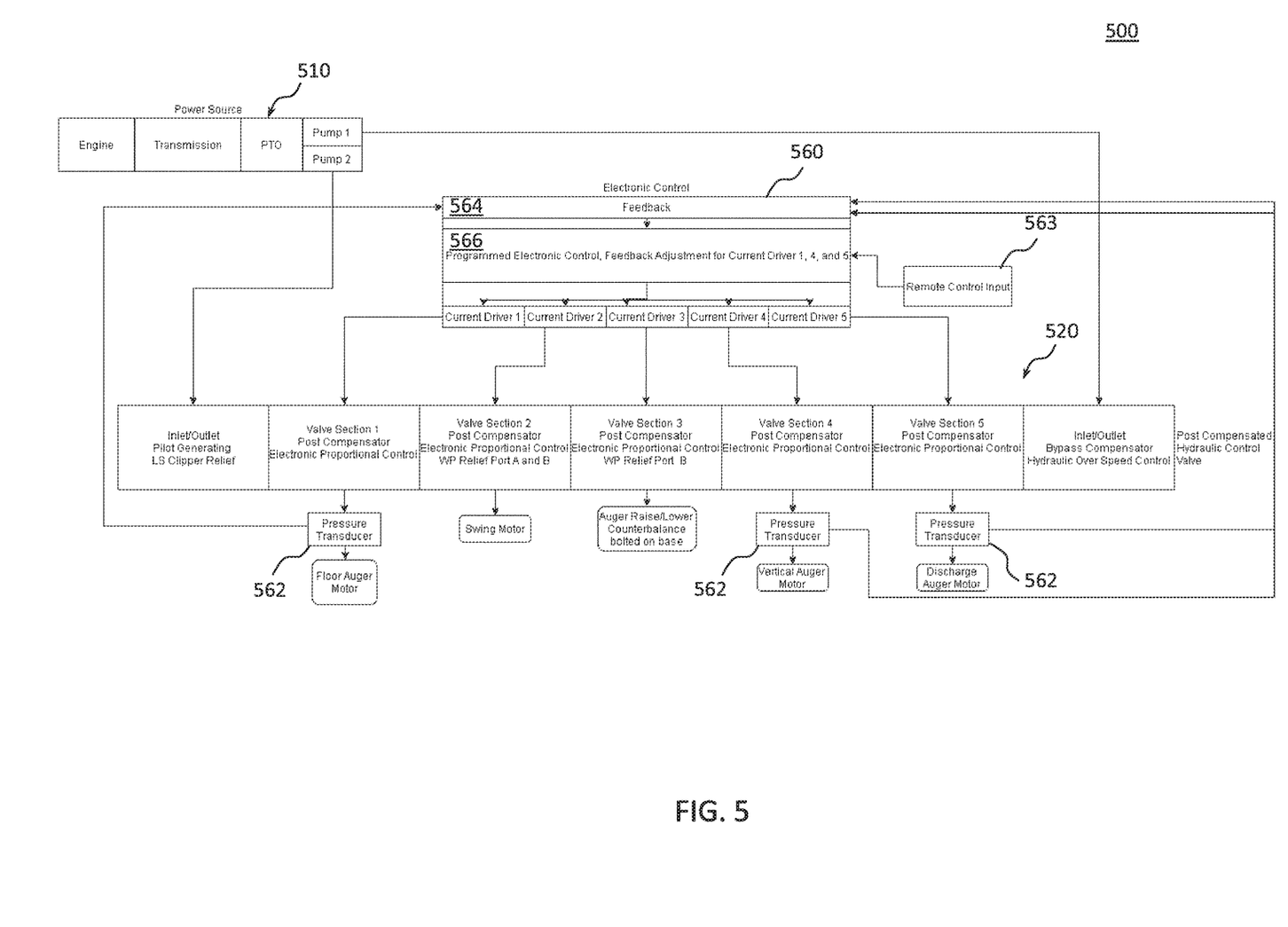
FIG. 5 is a functional block diagram of certain components of a feed delivery unit in accordance with the present disclosure.
Figure 6:
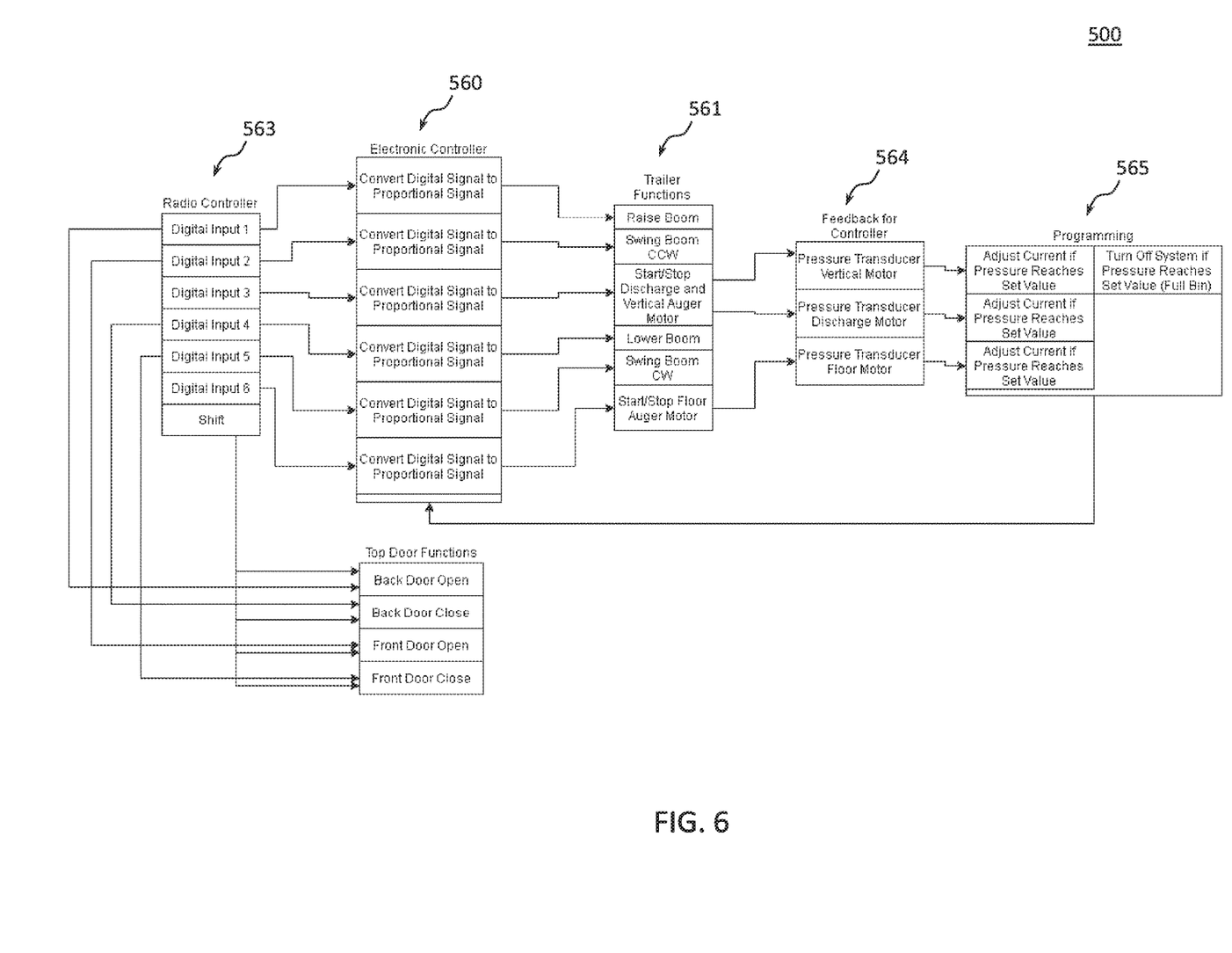
FIG. 6 is another functional block diagram of a system in accordance with the present disclosure.

Referring now also to FIGS. 5 and 6, electronic control of the system in accordance with some examples is further described. FIG. 5 is a block diagram of a system 500. The system includes an electro-hydraulic valve 520 which is connected to a power source 510. The work ports of the valve 520 are connected to primary actuators (e.g., floor auger motor, swing motor, raise/lower actuator, vertical auger motor, and discharge auger motor). The valve 520 may be communicatively-coupled (e.g., wired) to an electronic controller 560 which is configured to transmit control signals to solenoids in the valve 520. Additionally, sensors 562 (e.g., pressure transducers) may be provided at each of the auger motors to measure pressure (e.g., to detect pressure build up) at the motors. The controller 560 may be configured to receive pressure measurements from any of the sensors 562 in a feedback circuit 564. The feedback circuit 564 may be configured to monitor the pressure at each of the motors in accordance with the examples herein. For example, the circuit may be configured to compare pressure measurements at each time increment to the pressure previously measured, in order to detect an increase in pressure. If the pressure at any given time increment is determined to be above a threshold pressure, which may be a parameter that is pre-programmed into the controller and/or user configurable in the field, the controller may be configured to generate corresponding control signals (e.g., reduce the driving current to corresponding solenoids associated with the particular circuit) to cause a reduction of flow to the motor at which pressure rise has been detected. The controller may be further configured to receive user inputs from a remote control input device 563, such as a radio controller, into a control adjustment circuit 566. The user inputs may, in some examples, correspond to user commands to start or stop any one of the individual auger motors (e.g., On/Off commands). These commands may also be converted to proportional control signals to the solenoids to control the amount of flow to a given motor. By passing the user inputs through the adjustment circuit 566 where the discrete On/Off commands are converted to proportional control signals, the electronic controller may in some embodiments be configured to smooth out the operation of the system providing for ramp up and ramp down of operation of the various spool sections. The feedback circuit 564 and control adjustment circuit 566 may thus operate in conjunction with one another to set the appropriate current for controlling the spool stroke of each spool of the valve 520. The control adjustment circuit 566 may generate control signals based on the user inputs, programmed parameters, and feedback data (e.g., pressure measurements) received from the feedback circuit 564. As shown in FIG. 6, the electronic controller 560 may be configured to convert digital signals corresponding to input received from the radio controller 563 to proportional control signals for setting the spool stroke and operating the feed delivery unit functions, as shown at 561. As described, the electronic controller 560 may generate the control signals based on user input and further based on feedback from sensors, as shown at 564, and programming, as shown at 565.

Example 1

Figure 7A:
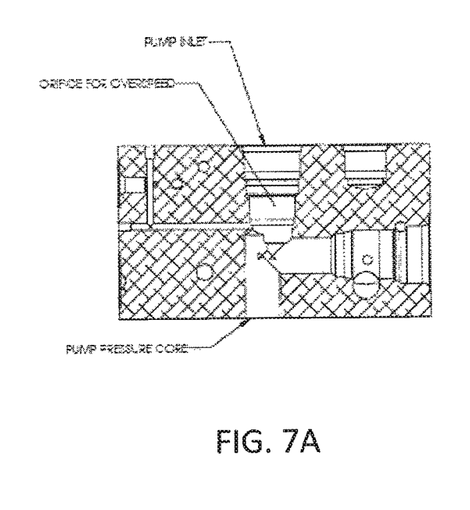
FIGS. 7A-7D are illustrations of an example end section of a hydraulic valve in accordance with the present disclosure.
Figure 7B:
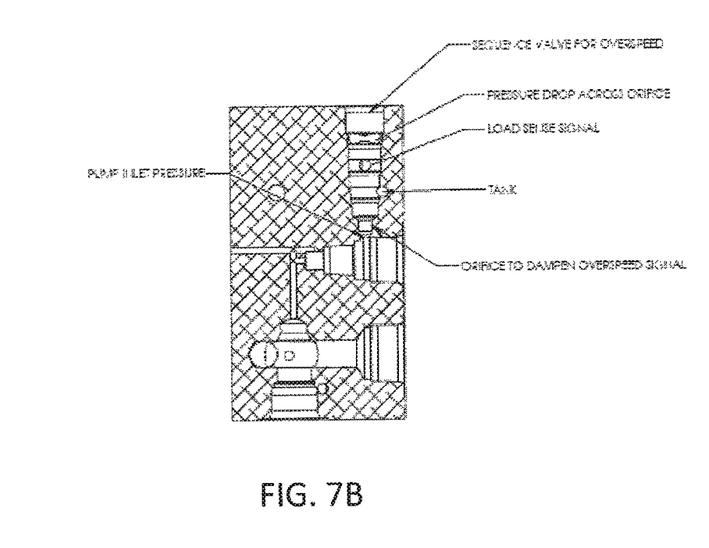
Figure 7C:
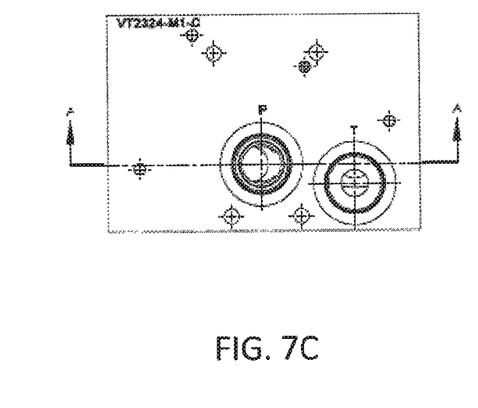
Figure 7D:
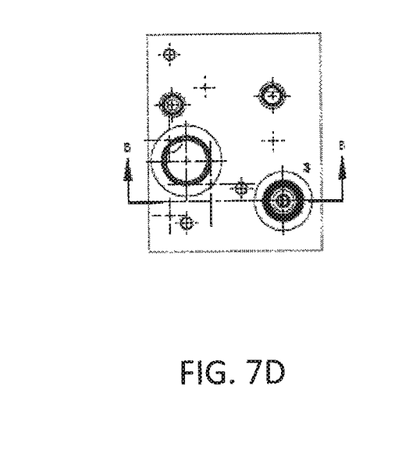

FIGS. 7A-7D illustrate views of an end section for a hydraulic control valve in accordance with the present disclosure. FIGS. 7C and 7D show first and second side elevational views which correspond to external faces or sides (e.g., adjacent sides) of the end section. FIG. 7A shows a cross-sectional view of the end section taken along the line A-A in the elevational view in FIG. 7C. FIG. 7B shows a cross-sectional view of the end section taken along the line B-B in the elevational view in FIG. 7D.

Illustrated in FIGS. 7C and 7A is pump inlet port (which was schematically shown at 421-2 in FIG. 4) and which connects pump flow to the ON-OFF valve (schematically shown as 444 in FIG. 4) and the bypass compensator (schematically shown as 422 in FIG. 4) for over-speed control. Shown also (see FIG. 7B) are the first orifice 446-1 and second orifice 446-2 (e.g., for damping the over-speed signal) associated with the ON-OFF valve. As described, the ON-OFF valve (FIG. 7B) and bypass compensator (see FIG. 7B) work in conjunction to sets the pump inlet pressure to a desired value and limit the risk of the system being operated to a speed (i.e., engine RPM) exceeding a desired operating speed. The example in FIGS. 7A-7D is shown for illustration of how the passages or cavities in the bypass compensating and HOC end section may be arranged, however it will be understood that in other embodiments different arrangement of passages may be used to implement the hydraulic circuit(s) described herein.

Non-limiting, inventive examples in accordance with the present disclosure are provided in the enumerated paragraphs below.

A1. A hydraulic system for a feed delivery unit, the system comprising:

a pump configured to supply a total flow, wherein the pump includes at least one suction port configured to be connected to a reservoir and at least one outlet port configured to be connected to a supply line;

a control valve fluidly coupled to the pump and comprising a plurality of valve sections, wherein control valve is coupled to the pump such that the total flow supplied by the pump is distributed among the plurality of valve sections, and wherein each valve section of the plurality of valve sections is configured to control a direction of flow of a portion of the total flow; and a plurality of hydraulic motors fluidly coupled to the pump via the control valve, each of the motors configured to drive a respective auger of the feed delivery unit.

A2. The hydraulic system according to paragraph A1, wherein the plurality of valve sections includes a first valve section configured to direct hydraulic fluid to and from a first hydraulic motor configured to drive a floor auger of the feed delivery unit, a second valve section configured to direct hydraulic fluid to and from a second hydraulic motor configured to drive a vertical auger of the feed delivery unit, and a third valve section configured to direct hydraulic fluid to and from a third hydraulic motor configured to drive a discharge auger of the feed delivery unit.

A3. The hydraulic system according to paragraph A2, wherein the first, second, and third valve sections are connected in parallel.

A4. The hydraulic system according to paragraph A2, wherein each of the first, second, and third valve sections comprises a six-way proportional directional control valve element with a pilot-operated spring-centered spool.

A5. The hydraulic system according to paragraph A4, wherein each of the first, second, and third valve sections further comprises a pressure compensating element configured to maintain a constant pressure drop across the spool of the respective one of the first, second, and third valve sections.

A6. The hydraulic system according to paragraph A4, wherein a first port of the directional control valve element is connected to the pump via the supply line, a second port and a third port of the directional control valve element are connected to one of the plurality of hydraulic motors, a fourth port of the directional control valve element is connected to a drain line configured to be connected to the reservoir, a fifth port of the directional control valve element is connected to a load sense line via one or more check valves configured to permit flow only towards the directional control valve element, and a sixth port of the directional control valve element is connected to the load sense line via a pressure compensating element.

A7. The hydraulic system according to paragraph A6, wherein the proportional directional control valve element further comprises a manual override.

A8. The hydraulic system according to paragraph A2, wherein the control valve further comprises a fourth valve section configured to direct hydraulic fluid to and from a fourth hydraulic motor configured to rotate a boom of the feed delivery unit.

A9. The hydraulic system according to paragraph A8, wherein the control valve further comprises a fifth valve section configured to direct hydraulic fluid to and from a hydraulic cylinder configured to raise and lower the boom.

A10. The hydraulic system according to paragraph A9, wherein at least one of the fourth valve section and the fifth valve section comprises a six-way closed-center proportional directional control valve element with a pilot-operated spring-centered spool.

A11. The hydraulic system according to paragraph A9 further comprising a counterbalance valve element operatively connected to the cylinder to control a speed of lowering of the boom.

A12. The hydraulic system according to any of paragraphs A1 through A11, wherein the control valve includes a first end section configured to limit hydraulic pressure in the control valve to a maximum operating pressure.

A13. The hydraulic system according to paragraph A12, wherein the first end section comprises a pressure relief valve element configured to couple a load sense line to the reservoir when the hydraulic pressure in the control valve reaches the maximum operating pressure.

A14. The hydraulic system according to paragraph A13, wherein the first end section further comprises a pressure reducing valve element configured to couple flow from the supply line to one or more pilot lines of the control valve, and wherein the pressure reducing valve element is further configured to reduce the pressure in the pilot lines if the pressure exceeds a predetermined amount.

A15. The hydraulic system according to any of paragraphs A1 through A11, wherein the control valve includes a second end section configured to bypass hydraulic fluid not used by the control valve to the reservoir and provide hydraulic over-speed control.

A16. The hydraulic system according to any of paragraphs A1 through A11, wherein the control valve includes a second end section configured to sense a pressure build-up in the supply line and couple the supply line to the reservoir if the pressure build-up exceeds a threshold amount.

A17. The hydraulic system according to paragraph A16, wherein the second end section includes a ON-OFF valve element comprises a two-position, two-way valve element having a first port connected to a load sense line and a second port connected to the reservoir, the over-speed control valve element further comprising:

a pilot connected to sense line pressure upstream of a flow restrictor in the supply line; and a spring chamber connected to the supply line downstream of the flow restrictor.

A18. The hydraulic system according to any of paragraphs A1 through A11, wherein the control valve includes a first end section configured to limit hydraulic pressure in the control valve to a maximum operating pressure and a second end section configured to bypass hydraulic fluid not used by the control valve to the reservoir and provide hydraulic over-speed control.

A19. The hydraulic system according to paragraph A18, wherein the pump is a tandem pump and wherein the flow supplied by each pump of the tandem pump is combined to provide the total flow.

A20. The hydraulic system according to paragraph A19, wherein each pump of the tandem pump is a fixed or variable displacement pump.

A21. The hydraulic system according to paragraph A18, wherein the pump is connected to a power take off shaft of the feed delivery unit.

A22. The hydraulic system according to paragraph A18 further comprising at least one filter fluidly coupled to the supply line.

A23. The hydraulic system according to paragraph A22, wherein the at least one filter comprises a high pressure in-line filter.

A24. The hydraulic system according to paragraph A18 further comprising an electronic controller configured to generate signals for energizing one or more solenoids of the control valve based on user input.

A25. The hydraulic system according to paragraph A24, wherein the electronic controller is further configured to receive pressure or speed measurement from one or more sensors operatively associated with the hydraulic system and configured to generate the signals further based on the pressure or speed measurements.

A26. The hydraulic system according to paragraph A25, wherein the electronic controller is configured to receive pressure measurements from a plurality of pressure transducers, each arranged to measure a working pressure at a respective one of the plurality of hydraulic motors.

B1. A hydraulic valve comprising:

a first end section configured to generate pilot pressure, wherein the first end section comprises a pressure relief valve element configured to limit pressure in the hydraulic valve to a predetermined operating pressure and a pressure reducing valve element configured to reduce pressure on a pilot line of the hydraulic valve;

a plurality of valve sections, each configured to control a direction of flow to and from a primary actuator, wherein each of the plurality of valve sections includes a six-way proportional directional control valve element with a pilot-operated spring-centered spool, and wherein each of the plurality of valve sections further comprises a pressure compensating element; and a second end section configured to provide bypass compensation and hydraulic over-speed control, wherein the second end section comprises a compensating element configured to bypass hydraulic fluid not used by the hydraulic valve to tank and a ON-OFF valve configured to limit a rate of flow into the valve to a predetermined flow rate.

B2. The hydraulic valve according to paragraph B1, wherein each valve section of the plurality of valve sections is configured to proportionally control a portion of a total flow provided to the primary actuators independent from operating load.

Although certain embodiments of the present disclosure are described herein with reference to the examples in the accompanying figures, it would be apparent to those skilled in the art that several modifications to the described embodiments, as well as other embodiments of the present invention are possible without departing from the spirit and scope of the present disclosure.

What is claimed is:

1. A hydraulic system for a feed delivery unit, the system comprising:
   a pump configured to supply a total flow, wherein the pump includes at least one suction port configured to be connected to a reservoir and at least one outlet port configured to be connected to a supply line;
   a control valve fluidly coupled to the pump and comprising a plurality of valve sections, wherein the control valve is coupled to the pump such that the total flow supplied by the pump is distributed among the plurality of valve sections, and wherein each valve section of the plurality of valve sections is configured to control a direction of flow of a portion of the total flow; and
   a plurality of hydraulic motors fluidly coupled to the pump via the control valve, each of the hydraulic motors is configured to drive a respective auger of the feed delivery unit,
   wherein the control valve includes a first end section configured to limit hydraulic pressure in the control valve to a maximum operating pressure.

2. The hydraulic system of claim 1, wherein the plurality of valve sections includes a first valve section configured to direct hydraulic fluid to and from a first hydraulic motor configured to drive a floor auger of the feed delivery unit, a second valve section configured to direct hydraulic fluid to and from a second hydraulic motor configured to drive a vertical auger of the feed delivery unit, and a third valve section configured to direct hydraulic fluid to and from a third hydraulic motor configured to drive a discharge auger of the feed delivery unit.

3. The hydraulic system of claim 2, wherein the first, second, and third valve sections are connected in parallel.

4. The hydraulic system of claim 2, wherein each of the first, second, and third valve sections comprises a six-way proportional directional control valve element with a pilot-operated spring-centered spool.

5. The hydraulic system of claim 4, wherein each of the first, second, and third valve sections further comprises a pressure compensating element configured to maintain a constant pressure drop across the spool of the respective one of the first, second, and third valve sections.

6. The hydraulic system of claim 4, wherein a first port of the directional control valve element is connected to the pump via the supply line, a second port and a third port of the directional control valve element are connected to one of the plurality of hydraulic motors, a fourth port of the directional control valve element is connected to a drain line configured to be connected to the reservoir, a fifth port of the directional control valve element is connected to a load sense line via one or more check valves configured to permit flow only towards the directional control valve element, and a sixth port of the directional control valve element is connected to the load sense line via a pressure compensating element.

7. The hydraulic system of claim 2, wherein the control valve further comprises a fourth valve section configured to direct hydraulic fluid to and from a fourth hydraulic motor configured to rotate a boom of the feed delivery unit.

8. The hydraulic system of claim 7, wherein the control valve further comprises a fifth valve section configured to direct hydraulic fluid to and from a hydraulic cylinder configured to raise and lower the boom.

9. The hydraulic system of claim 8, wherein at least one of the fourth valve section and the fifth valve section comprises a six-way closed-center proportional directional control valve element with a pilot-operated spring-centered spool.

10. The hydraulic system of claim 8 further comprising a counterbalance valve element operatively connected to the cylinder to control a speed of lowering of the boom.

11. The hydraulic system of claim 1, wherein the first end section comprises a pressure relief valve element configured to couple a load sense line to the reservoir when the hydraulic pressure in the control valve reaches the maximum operating pressure.

12. The hydraulic system of claim 11, wherein the first end section further comprises a pressure reducing valve element configured to couple flow from the supply line to one or more pilot lines of the control valve, and wherein the pressure reducing valve element is further configured to reduce the pressure in the pilot lines if the pressure exceeds a predetermined amount.

13. The hydraulic system of claim 1, wherein the first end section comprises a pressure relief valve element configured to limit pressure in the control valve to a predetermined operating pressure and a pressure reducing valve element configured to reduce pressure on a pilot line of the control valve.

14. A hydraulic system for a feed delivery unit, the system comprising:
   a pump configured to supply a total flow, wherein the pump includes at least one suction port configured to be connected to a reservoir and at least one outlet port configured to be connected to a supply line;
   a control valve fluidly coupled to the pump and comprising a plurality of valve sections, wherein the control valve is coupled to the pump such that the total flow supplied by the pump is distributed among the plurality of valve sections, and wherein each valve section of the plurality of valve sections is configured to control a direction of flow of a portion of the total flow; and a plurality of hydraulic motors fluidly coupled to the pump via the control valve, each of the hydraulic motors is configured to drive a respective auger of the feed delivery unit, wherein the control valve includes a second end section configured to bypass hydraulic fluid not used by the control valve to the reservoir and provide hydraulic over-speed control.

15. The hydraulic system of claim 14, wherein the control valve includes a second end section configured to sense a pressure build-up in the supply line and couple the supply line to the reservoir if the pressure build-up exceeds a threshold amount.

16. The hydraulic system of claim 15, wherein the second end section includes a ON-OFF valve element that comprises a two-position, two-way valve element having a first port connected to a load sense line and a second port connected to the reservoir, the over-speed control valve element further comprising:
  a pilot connected to sense line pressure upstream of a flow restrictor in the supply line; and
  a spring chamber connected to the supply line downstream of the flow restrictor.

17. The hydraulic system of claim 14, wherein the second end section comprises a compensating element configured to bypass hydraulic fluid not used by the control valve.

18. A hydraulic system for a feed delivery unit, the system comprising:
  a pump configured to supply a total flow, wherein the pump includes at least one suction port configured to be connected to a reservoir and at least one outlet port configured to be connected to a supply line;
  a control valve fluidly coupled to the pump and comprising a plurality of valve sections, wherein the control valve is coupled to the pump such that the total flow supplied by the pump is distributed among the plurality of valve sections, and wherein each valve section of the plurality of valve sections is configured to control a direction of flow of a portion of the total flow; and
  a plurality of hydraulic motors fluidly coupled to the pump via the control valve, each of the hydraulic motors is configured to drive a respective auger of the feed delivery unit,
  wherein the control valve includes a first end section configured to limit hydraulic pressure in the control valve to a maximum operating pressure and a second end section configured to bypass hydraulic fluid not used by the control valve to the reservoir and provide hydraulic over-speed control.

19. The hydraulic system of claim 18, wherein the pump is a tandem pump and wherein the flow supplied by each pump of the tandem pump is combined to provide the total flow.

20. The hydraulic system of claim 18 further comprising an electronic controller configured to generate signals for energizing one or more solenoids of the control valve based on user input and further based on pressure or speed measurements received from one or more sensors operatively associated with the hydraulic system.

* * * * *